(12) United States Patent
Harris et al.

(10) Patent No.: US 6,314,907 B1
(45) Date of Patent: Nov. 13, 2001

(54) DEVICE USE INDICATOR

(75) Inventors: Ward Edwin Harris; Lokanathan M. Iyer, both of Bellevue; Brian D. Hench, Shoreline, all of WA (US)

(73) Assignee: Optiva, Snoqualmie, WA (US)

( * ) Notice: Subject to any disclaimer, the term of this patent is extended or adjusted under 35 U.S.C. 154(b) by 0 days.

(21) Appl. No.: 09/365,691

(22) Filed: Aug. 2, 1999

(51) Int. Cl.[7] .................................................. G01D 21/00
(52) U.S. Cl. ............................ 116/206; 116/200; 116/208
(58) Field of Search .................................... 116/200, 206, 116/208, 280; 15/167.1, 160, 159.1; 368/327

(56) References Cited

U.S. PATENT DOCUMENTS

| | | |
|---|---|---|
| 3,018,611 | 1/1962 | Biritz . |
| 3,520,124 | 7/1970 | Myers . |
| 3,542,519 | 11/1970 | Montalto et al. . |
| 3,791,794 | 2/1974 | Tomkin . |
| 3,876,378 | 4/1975 | Montagnon . |
| 4,028,876 | 6/1977 | Delatorre . |
| 4,137,049 | 1/1979 | Couch et al. . |
| 4,195,058 | 3/1980 | Patel . |
| 4,212,153 | 7/1980 | Kydonieus et al. . |
| 4,229,813 | 10/1980 | Lilly et al. . |
| 4,404,922 | 9/1983 | Morane et al. . |
| 4,408,557 | 10/1983 | Bradley et al. . |
| 4,469,452 | 9/1984 | Sharpless et al. . |
| 4,643,122 | 2/1987 | Seybold . |
| 4,740,139 | 4/1988 | Mantell . |
| 4,802,255 | * 2/1989 | Breuer et al. ........................ 15/167.1 |
| 4,821,671 | 4/1989 | Borgardt . |
| 4,903,254 | 2/1990 | Haas . |
| 4,961,698 | 10/1990 | Vlock . |
| 4,979,400 | 12/1990 | Bartholomew . |
| 5,058,088 | 10/1991 | Haas et al. . |
| 5,107,470 | 4/1992 | Pedicano et al. . |
| 5,158,349 | 10/1992 | Holland et al. . |
| 5,180,288 | 1/1993 | Richter et al. . |
| 5,182,212 | * 1/1993 | Jalinski ................................ 116/206 |
| 5,221,186 | 6/1993 | Machin . |
| 5,242,830 | 9/1993 | Argy et al. . |
| 5,313,909 | * 5/1994 | Tseng et al. ........................ 116/200 |
| 5,317,987 | * 6/1994 | Muller et al. ....................... 116/206 |
| 5,323,729 | 6/1994 | Rubey . |
| 5,529,841 | 6/1996 | Neihof . |
| 5,602,804 | 2/1997 | Haas . |
| 5,633,835 | 5/1997 | Haas et al. . |
| 5,633,836 | 5/1997 | Langer et al. . |
| 5,699,326 | 12/1997 | Haas et al. . |
| 5,717,972 | 2/1998 | Patton et al. . |
| 5,784,742 | * 7/1998 | Giuliani et al. ..................... 15/167.1 |
| 5,788,375 | 8/1998 | Parker et al. . |
| 5,797,344 | 8/1998 | Ramsey et al. . |
| 5,815,872 | * 10/1998 | Meginniss, III et al. ........... 15/167.1 |
| 5,824,554 | 10/1998 | McKay . |
| 5,877,580 | 3/1999 | Swierkowski . |
| 5,906,834 | * 5/1999 | Tseng .................................... 15/160 |
| 6,081,957 | * 7/2000 | Webb .................................. 15/167.1 |

* cited by examiner

Primary Examiner—Diego Gutierrez
Assistant Examiner—Yaritza Guadalupe

(57) ABSTRACT

A device use indicator (16), which is designed to signal a predetermined amount of use of a device as a function of the amount of vibration of the device is provided. The indicator is adapted to be coupled or attached to a device (10). The indicator includes a first disk (18), a second disk (20), and an intermediate layer (22) separating the first disk from the second disk. The first disk retains a chemical therein. In operation, when the device to which the use indicator is attached is used, vibration of the device and the indicator triggers release of the chemical from the first disk. The chemical then travels through the intermediate layer to be received by the second disk. The chemical, when received by the second disk in excess of a predetermined amount, creates a detectable indication. The detectable indication, for example, a color or shade change produced in the second disk, signals a user that the device has been used for a predetermined amount of time as a function of the amount of its vibration.

26 Claims, 3 Drawing Sheets

DEVICE USE INDICATOR

FIELD OF THE INVENTION

The present invention relates to a use indicator for a device and, more particularly, to a use indicator coupled to a device to signal a predetermined amount of use of the device as measured in the amount of vibration experienced by the device.

BACKGROUND OF THE INVENTION

With improvements in toothbrush technology, power toothbrushes such as acoustic or sonic toothbrushes that vibrate at sonic frequencies, approximately 200 to 500 Hz, have been developed and are now widely used. A typical power toothbrush includes a toothbrush body that functions as a handle and a toothbrush head that is removably coupled to the toothbrush body. The toothbrush head includes a plurality of bristles affixed thereto. The toothbrush body includes a toothbrush driver that is adapted to vibrate the toothbrush head and, thus, the bristles affixed thereto. When the bristles on the toothbrush head vibrate against a user's teeth, the vibrating bristles both scrub contaminants off the tooth enamel and massage the adjacent soft gum tissue.

After some use, however, the toothbrush bristles tend to be broken down, split, or otherwise become ineffective for cleaning teeth or massaging gum tissue. Also, during prolonged use of a sonic toothbrush, its bristles may become unsanitary through accumulation of biodegradable debris and bacteria, especially around and in the bristles' sockets.

Thus, a need exists for a use indicator suitable for use with a power toothbrush, which is adapted to notify a user when to replace a toothbrush head before it loses its effective brushing ability or becomes unsanitary. Preferably, such a use indicator should be able to produce an easily detectable indication to a user after a predetermined period of time or period of use of the toothbrush. Such indicator would also find use with other devices where use of the device could be related to vibration of the device.

SUMMARY OF THE INVENTION

A device use indicator, which is designed to signal a predetermined amount of use of a device such as a power toothbrush, by measuring the amount of vibration of the device, is provided. The indicator is adapted to be coupled or attached to a device. The indicator includes a first disk, a second disk, and an intermediate layer interposed between the two disks. The first disk retains a chemical therein. In operation, when the device to which the use indicator is attached is used, vibration of the device and, thus, the use indicator, triggers release of the chemical from the first disk to the second disk. The chemical, when thus released from the first disk and received by the second disk, causes a detectable indication after a predetermined amount of the chemical released from the first disk is received by the second disk. The detectable indication, for example, a change in pH or color or shade change produced in the second disk, signals a user that the device has been used for a predetermined amount of time as measured in the amount of its vibration. To contain the disks, chemicals, and intermediate layer, some type of encapsulation is preferably provided.

In accordance with one aspect of the invention, the second disk of the use indicator may also retain a chemical therein that, when combined with the chemical that migrates from the first disk to the second disk upon vibration of the use indicator, produces a chemical reaction within the second disk to cause a detectable indication. For example, the two chemicals may comprise an acid and a base, or a base and an acid, to effect an acid-base titration in the second disk. To provide a visible report of the acid-base titration, the second disk may include a pH-indicating dye that changes its color in response to the acid-base titration.

In accordance with another aspect of the invention, a device use indicator of the present invention may be used in connection with a power toothbrush, such as an acoustic toothbrush, so as to signal when to replace a toothbrush head before the toothbrush's bristles become too worn or unsanitary.

In accordance with a further aspect of the present invention, the chemicals retained in the first and second disks may be in liquid form, and as the liquid transfers from the first disk to the second disk the chemical reaction within the second disk may form a gas. The gas thus formed may create pressure that can be utilized to perform some mechanical functions. One such function would be to move a piston. The movement of the piston can be made visible from the outside of the device.

In accordance with a still further aspect of the invention, a device use indicator of the present invention may be used in connection with various devices, whose abnormal or undesirable operation is indicated by their vibration or unsymmetrical movement, for example a household washing machine. When used with these devices, the use indicator of the invention advantageously signals abnormal operation of the device to a user and, further, may perform some mechanical function to stop the device's abnormal operation, for example, by interrupting power input to the device.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Various devices that operate based on vibration exist, such as a power toothbrush. The present invention provides a device use indicator, which is designed to signal a predetermined amount of use of such a device, as a function of the amount of vibration of the device.

Figure 1:
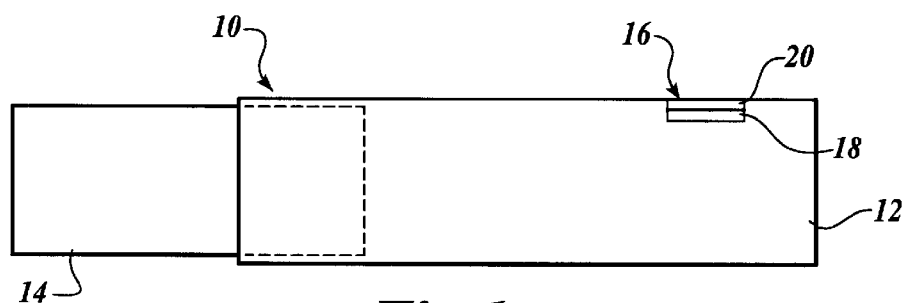
FIG. 1 is a schematic view of a device including a device use indicator of the present invention.

In FIG. 1, a generic device 10 includes a body 12, a driver 14 for vibrating the body 12, and a use indicator 16 of the present invention that is embedded within a hole provided on an outer surface of the body 12. The construction and operation of the driver 14 for vibrating the body 12 are not critical and are well known in the art and, thus, are not repeated here.

Figure 2:
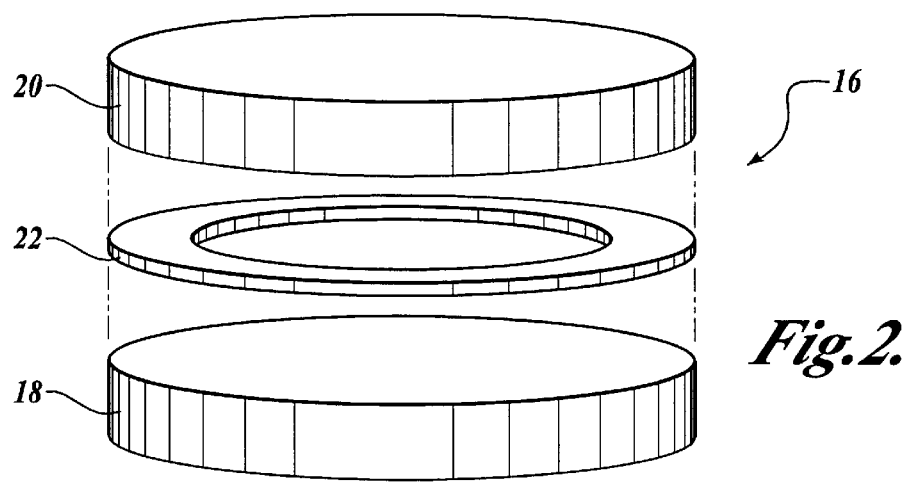
FIG. 2 is an exploded view of the device use indicator of FIG. 1.
Figure 3:
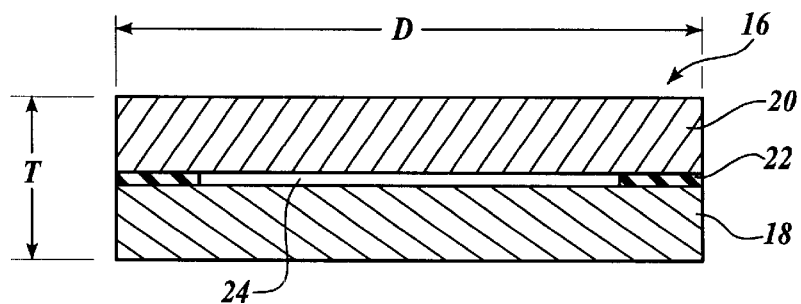
FIG. 3 is a cross-sectional view of the device use indicator of FIG. 2.

Referring additionally to FIGS. 2 and 3, the use indicator 16 includes a chemical retaining disk 18 retaining a chemical therein, a chemical receiving disk 20, and an intermediate layer 22 for separating the two disks 18, 20. In the embodiment shown, the intermediate layer 22 takes the form of an annular spacer interposed between the chemical retaining disk 18 and the chemical receiving disk 20. The annular spacer 22 defines a gap 24 between the two disks 18, 20, thus preventing direct contact between the disk 18 and the disk 20. The chemical retaining disk 18 is adapted to release the chemical therefrom upon vibration of the device body 12 and the chemical retaining disk 18. The chemical receiving disk 20 is adapted to receive and retain the chemical released from the chemical retaining disk 18. The chemical is transferred from the chemical retaining disk 18 away from the source of vibration (e.g., a toothbrush body); therefore the chemical transfers substantially in one direction only along the direction of the energy gradient, i.e., from the chemical retaining disk 18 to the chemical receiving disk 20. Thus, it is preferable to place the chemical receiving disk 20 on the exterior surface of the device body 12 relative to the chemical retaining disk 18, as shown in FIG. 1. Because the chemical transfers along the energy gradient, faces of the disks 18 and 20 are preferably oriented perpendicular to the direction of force or vibration, so that the direction of chemical transfer will be parallel with the direction of vibration.

The intermediate layer 22 serves to generally prohibit transfer of the chemical between the two disks when the use indicator 16 is not vibrating in the direction of the chemical transfer. The chemical initially retained in the chemical retaining disk 18, when transferred to the chemical receiving disk 20, is adapted to cause a detectable indication.

The chemical retaining disk 18 and the chemical receiving disk 20 are preferably sealed or encapsulated using any suitable transparent plastic cover material (not shown) applied where the disks are exposed to the outside air. The sealing cover prevents the chemical from drying out, and also serves to add support to the disks 18, 20.

The chemical retaining disk 18 and the chemical receiving disk 20 may be constructed of any material that can positively retain or receive a chemical therein. For retaining or receiving a chemical in the form of an aqueous fluid, the two disks 18, 20 should be formed of porous hydrophilic material, such as sintered glass, foamed glass, sintered metal, ceramic, high-density polyethylene, high-density polypropylene, and nylon.

The intermediate layer (e.g., the annular spacer) may be made of any suitable material that generally prevents transfer of the chemical therethrough. For example, when the chemical is in the form of an aqueous fluid, the annular spacer as shown in FIG. 2 is formed of any hydrophobic material, for example, nylon, polyester (Mylar®), and fluoroethylenes such as polytetrafluoroethylene.

The gap 24 may be filled with air or may be filled with a suitable barrier material that prevents transfer of the chemical between the two disks when the use indicator is not vibrating. Depending on the kind of barrier material employed, or whether a barrier material is used at all, some chemical release from the chemical retaining disk 18 to the chemical receiving disk 20 may occur over time without vibration. Though the majority of chemical release occurs due to vibration of the device 10, natural chemical release over time should also be taken into account when adjusting a use indicator to provide a signal after a predetermined amount of use of the device, as more fully described below.

The chemical retained in the chemical retaining disk 18 is selectively chosen so as to produce a detectable indication upon migration into the chemical receiving disk 20. The indication may be of any detectable nature, for example, a color or shade chance created in the chemical receiving disk 20 that a user can view from the outside of the device body 12. In any event, the detectable indication is produced in proportion to the amount of chemical released from the chemical retaining disk 18 or received by the chemical receiving disk 20.

In this regard, the chemical receiving disk 20 may also retain a chemical that, when combined with the chemical migrating from the chemical retaining disk 18, interacts with and/or produces a chemical reaction within the chemical receiving disk 20 that produces a detectable indication. The interaction and/or chemical reaction is preferably directly proportional to the amount of the chemical released from the chemical retaining disk 18 and received by the chemical receiving disk 20 and, hence, the amount of vibration of the device 10.

As a specific example, the chemical retaining disk 18 may retain an acid therein and the chemical receiving disk 20 may retain a base therein, or the chemical retaining disk 18 may retain a base therein and the chemical receiving disk 20 may retain an acid therein. The chemical reaction produced in this example is an acidbase titration. To report the occurrence of the chemical reaction to a user, the chemical receiving disk 20 further includes a suitable pH-indicating dye that changes its color in response to the acid-base titration.

It has been found that the present example can be practiced by including a weak base formed of sodium acetate or sodium bicarbonate in water in the chemical retaining disk 18, and by including acetic acid and a phenol red (pH-indicating) dye in the chemical receiving disk 20. Here, the phenol red dye in the chemical receiving disk 20 is initially light yellow, indicating an acidic condition within the chemical receiving disk 20. When the device 10 is vibrated, a portion of the weak base in the chemical retaining disk 18 is released and travels across the gap 24 into the chemical receiving disk 20. This base transfer causes neutralization of the acid retained within the chemical receiving disk 20. When complete neutralization occurs, the phenol red dye in the chemical receiving disk 20 changes its color from light yellow to red. Those skilled in the art may adjust the concentrations and proportions of the acid and base so that complete neutralization of the acid will occur after a predetermined amount of vibration of the device 10 and, hence, a predetermined amount of use of the device.

Other pH-indicating dyes well known in the art may be used, such as Quinaldine red, 2,2 dinitrophenol, ethyl red, p-nitrophenol, m-nitrophenol, o-cresol phthalein, ethyl-bisdimethyl phenyl ethanoate, thymolphthalene, Congo red, and 1-3-5trinitrobenzene.

A chemical reaction suitable for use in an use indicator of the present invention is not limited to an acid-base titration. For example, a chemical oxidationreduction reaction ("redox") may be used. One example of a redox-type reaction involves oxidation of a methylene blue solution, from colorless in reduced state to dark blue in oxidized state. Atmospheric oxygen can be used as oxidant. At a basic pH, glucose can reduce the dark blue methylene back to a colorless state. The compound indigo carmine can be substituted for methylene blue. This color reaction goes through yellow to green with oxidation. A number of reducing sugars can be used in place of glucose. As a further example of a redox-type reaction, phenanthroline hydrate in ferric sulfate with an oxidant such as $KBrO_3$ can be used to cycle between oxidized state and reduced state in the presence of a compound such as malonic acid.

Other examples of a chemical reaction suitable for use in a device use indicator of the present invention include an addition reaction, a subtraction reaction, and an initiation of an enzymatic reaction, which will all produce some detectable indication.

Figure 4B:
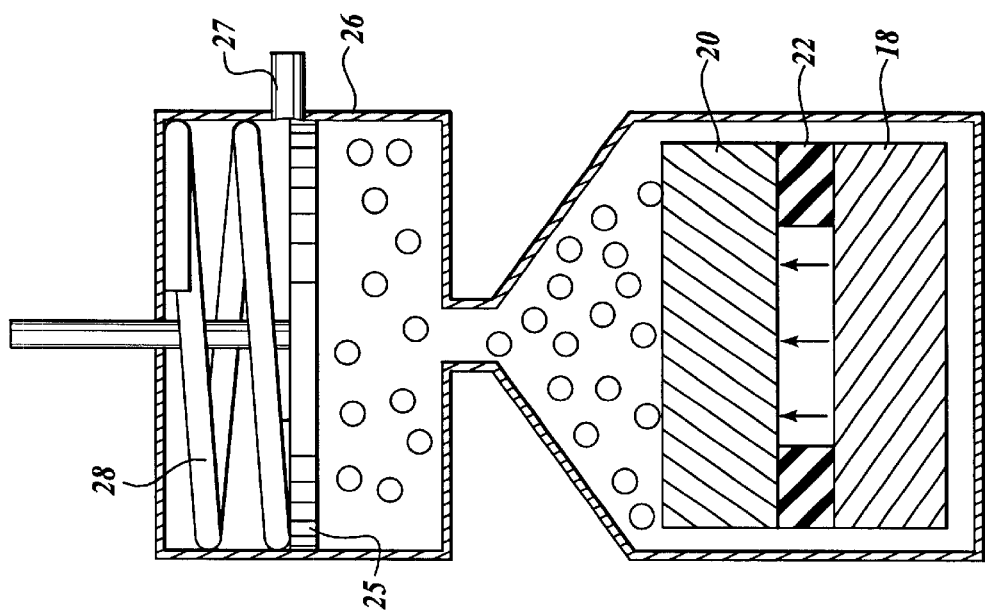
FIGS. 4A through 4D illustrate operation of an embodiment of a device use indicator of the present invention including a movable piston.
Figure 4A:
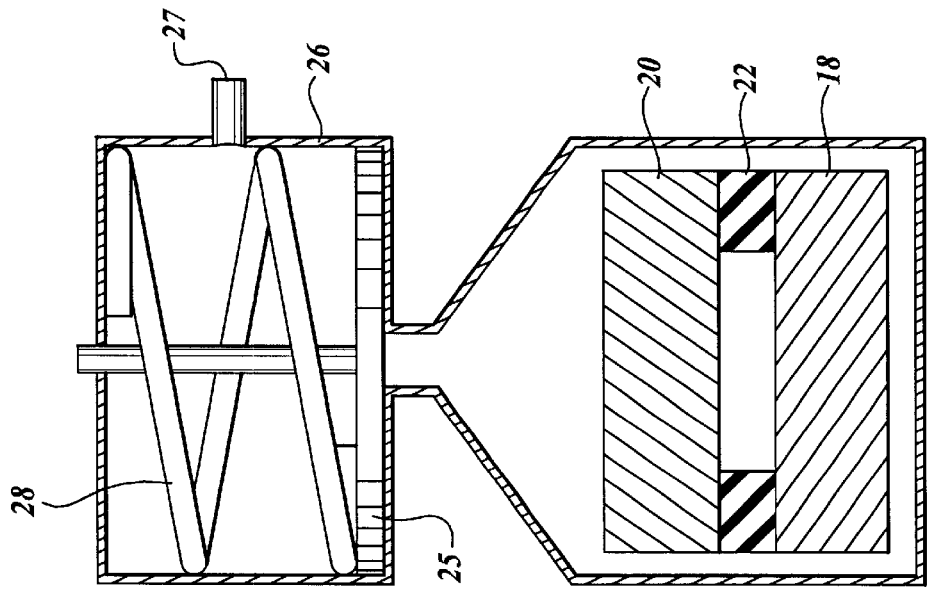
Figure 4D:
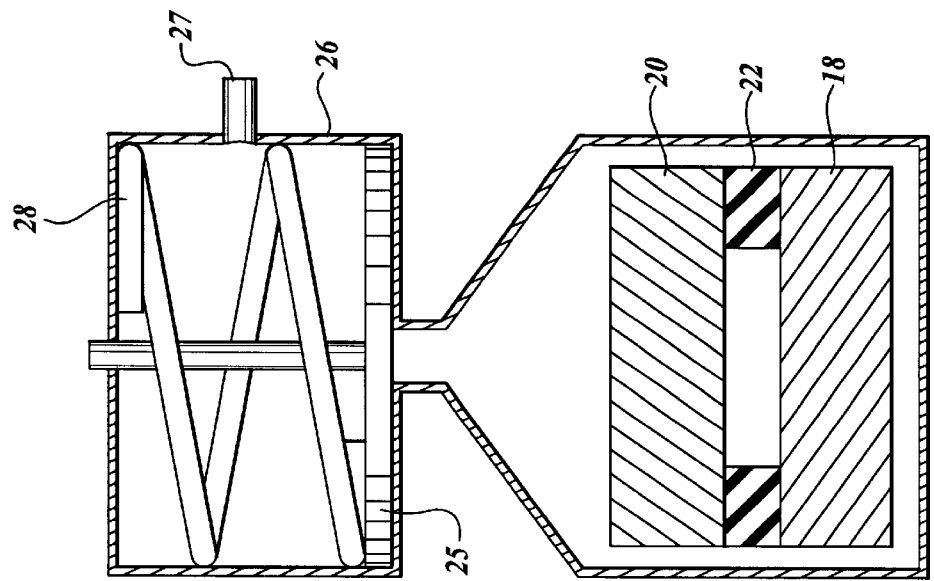
Figure 4C:
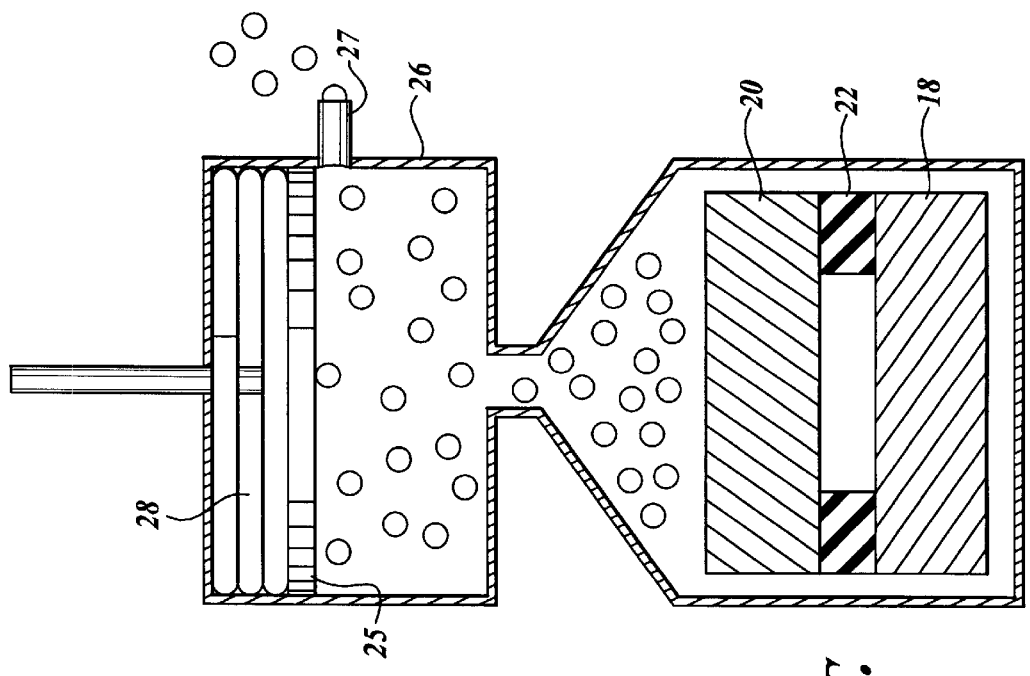

As a further alternative, a chemical reaction may create a detectable indication that can perform a mechanical function. Referring to FIG. 4A, the chemical retaining disk 18 includes a chemical in the form of a liquid, and the chemical receiving disk 20 also includes a chemical in the form of a liquid. The two chemicals are selected so that the chemical reaction of the liquids within the chemical receiving disk 20 will form a gas (for example, carbon dioxide ($CO_2$)), creating pressure to operate a piston 25. For example, one mole of water in the liquid state at atmospheric pressure will occupy 0.018 liter, while the same amount of water in the gaseous state will occupy 22.4 liters, with an increase of over one-thousandfold. The piston 25 is movably situated in an expansion cylinder 26 including a vent 27. As shown in FIGS. 4A through 4C, as the gas is formed and pressure increases, the piston 25 will be pushed out until it moves past the vent 27 (FIG. 4C). Thereafter, the gas pressure will be released through the vent 27 to the outside of the expansion cylinder 26, and the piston movement will stop. If desired, a mechanical spring 28 may be optionally placed in the expansion cylinder 26 to return the piston 25 to its original position after the chemical reaction is completed and the gas vented (see FIG. 4D). The movement of the piston 25 can be made visible from outside the device to signal to a user that a predetermined amount of use of the device 10 has occurred. In this embodiment, the amount of chemicals loaded into the disks 18, 20 will determine how many times the piston 25 could be activated (each time being reset to its original position) until the chemical reactants are exhausted.

A use indicator that performs some mechanical function, such as the one described above, may be used with any device, whose abnormal or undesirable operation is indicated by their vibration or unsymmetrical movement, for example a household washing machine. When used with these types of devices, the use indicator of the present invention advantageously signals abnormal operation of the device, and further serves as a safety device to stop the device's abnormal, harmful operation. For example, one may couple the piston 25 of the use indicator shown in FIGS. 4A through 4D to an electrical power switch of a device. The piston 25 is adapted so as to turn the switch "off" to cut the electrical power to the device when the piston 25 is fully extended (as in FIG. 4C). When such use indicator is used with a washing machine, if the washing machine becomes unbalanced and begins erratic vibrations, the chemical transfer between the two disks 18, 20 will generate gas and the gas will push the piston 25 to turn off the power to the washing machine. As before, the use indicator is advantageously oriented so that its direction of the chemical transfer will be generally parallel with the direction of the energy gradient of the undesirable movement that the use indicator is designed to detect.

As a further example, a device use indicator as illustrated in FIGS. 4A through 4D may be applied to a housing or a shaft of an electric motor. As before, the piston 25 of the mechanical use indicator is coupled to an electric switch of the motor. When the motor continues its smooth motion, the use indicator will remain dormant. However, when a bearing of the motor begins to wear or fail, the housing or shaft of the motor will begin to exhibit some unsymmetrical movement. The use indicator is oriented so that this unsymmetrical movement will cause the chemical transfer between the two disks within the indicator, which generates gas, which in turn moves the piston 25 to turn off the electric switch to interrupt power input to the motor. This mechanism would prevent damage to the motor and its attendant equipment. Such use of a device use indicator of the present invention would be particularly useful in connection with various untended or remotely operated electric motor systems. Alternatively, the piston 25 may be adapted to turn "on" a switch, for example, when it is desired to activate some secondary mechanism after a device has experienced a predetermined amount of vibration or use. With any chemical reaction that produces a certain detectable indication, the rate of chemical transfer between the disks should be carefully controlled so as to produce the detectable indication only after the device has experienced a predetermined amount of vibration that causes the chemical transfer. The amount of vibration of the device is correlated to the amount of use of the device and, oftentimes, to the amount of time the device has been used.

As will be readily appreciated by those skilled in the art, the chemical transfer from the chemical retaining disk 18 to the chemical receiving disk 20 can be controlled by the composition of the material forming the disks 18, 20; the size of the gap 24 between the disks 18, 20 (i.e., the thickness of the spacer 22); the surface area of each disk 18, 20 that is exposed to the gap 24; inclusion of certain agents that affect physical and chemical properties of the chemicals used; the viscosity of the fluids that contain the chemicals; and the three-dimensional shape of the disks 18, 20. For reference, movement of fluid containing a chemical through a barrier material provided in the gap 24 can be described according to "Darcey's Law", as known in the art, in the following equation:

$$Q = KS\,(H+e)/e \qquad (1)$$

where Q is the volume of fluid transfer/time unit; K is Darcey's constant, which depends upon fluid viscosity and density; S is the surface area of the barrier material; e is the thickness of the barrier material; and H is the pressure across the use indicator. In general, as the surface area of the barrier material (S) or the pressure across the use indicator (H) is increased, the transfer volume per unit time (Q) is also increased. On the other hand, as the thickness of the barrier material (e) is increased, the transfer volume per unit time (Q) typically decreases.

Figure 5:
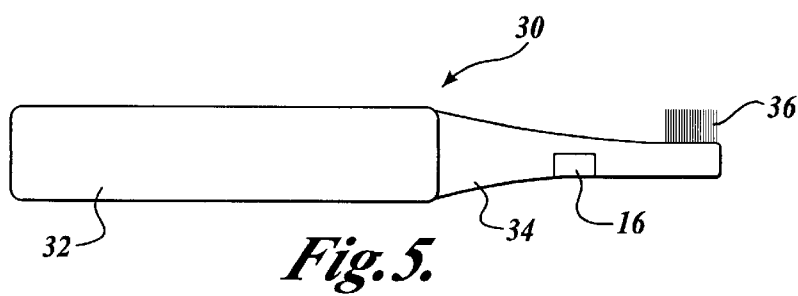
FIG. 5 illustrates a power toothbrush including a device use indicator of the present invention that is used as a brushwear indicator.

FIG. 5 illustrates one embodiment of a device use indicator of the present invention, as applied in a power toothbrush 30. The toothbrush 30 includes a body 32 and a toothbrush head 34 that is removably coupled to the toothbrush body 32. The construction of the power toothbrush 30 is well known in the art and, thus, is not repeated here. The toothbrush head 34 includes a plurality of bristles 36 affixed thereto. Further, the head 34 includes a use indicator 16 of the present invention embedded therein. As used in the power toothbrush 30, the use indicator 16 functions as a brushwear indicator, to signal a user when to replace the toothbrush head 34 before the bristles 36 become too worn or unsanitary.

To this end, assuming that a user brushes his or her teeth twice a day, for approximately two minutes at a time, as currently regarded to be a desired brushing time, a typical toothbrush head 34 should be replaced about every six months, before its bristles become too worn or unsanitary.

The six-month use of the toothbrush 30 amounts to its vibrational operation for the duration of 730 (=2×2×365/2) minutes. As noted above, those skilled in the art may determine the material and configuration of the disks 18, 20 and the spacer 22, or the composition of the chemical(s) used, to produce a suitable chemical reaction producing a detectable indication after this predetermined amount of vibration of the toothbrush 30. It has been found that approximate dimensions of the indicator 16 suitable for use with a power toothbrush, in a disk form as shown in FIG. 3, are 1 to 7 mm in thickness "T" and 7.5 to 10 mm in diameter "D".

EXAMPLE

A first disk and a second disk were made of Porex X-4741 or IRM 0120 high-density polyethylene filter material. The dimension of each disk was 8.5 mm in diameter and ⅛ inch thick. The first disk was 90% saturated with 95 $\mu$l of 0.1 mM sodium acetate. The second disk was 80% saturated with 80 $\mu$l of 0.075 mM acetic acid and 10 $\mu$l of 0.1% phenol red dye or a combination of phenol red and Congo red dyes. An annular spacer made of Mylar®-type plastic, having a thickness of between $7.5/1000$ and $10/1000$ inch, an external diameter of 9 mm, and an inner diameter (the outer circumference of a gap) of 4 mm was interposed between the first and second disks to form a use indicator. The indicator thus formed was then press-fitted in a hole provided on an external surface of a brush head of a Sonicare® power toothbrush, available from Optiva Corp. of Snoqualmie, Wash. The indicator was originally light yellow for a phenol red solution, or light green for a solution containing both phenol red and Congo red. After 12 hours of continuous use, which is equivalent to 6 months of normal toothbrush use, the color of the indicator changed to red.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A device use indicator for coupling to a device, the use indicator when coupled to the device signaling a predetermined amount of use of the device as a function of an amount of vibration of the device, the use indicator comprising:
   a first disk retaining a first chemical therein, the first disk being adapted to release the first chemical therefrom upon vibration of the first disk;
   a second disk adapted for receiving the first chemical released from the first disk; and
   an intermediate layer separating the first disk from the second disk;
   wherein the first chemical retained in the first disk, when received by the second disk in excess of a predetermined amount, creates a detectable indication of use of the device the predetermined amount being above zero.

2. The use indicator of claim 1, in combination with the device to which the use indicator is coupled, wherein the device is a power toothbrush including a toothbrush body and a brush head that is removably coupled to the toothbrush body, and the use indicator is a brushwear indicator attached to the brush head of the power toothbrush.

3. The use indicator of claim 1, wherein the detectable indication is a visible change.

4. The use indicator of claim 3, wherein the visible change is a color or shade change.

5. The use indicator of claim 1, wherein the second disk retains a second chemical therein, and receipt of the first chemical released from the first disk by the second disk produces a chemical reaction within the second disk to cause the detectable indication.

6. The use indicator of claim 5, wherein the first chemical and the second chemical comprise an acid and a base, or a base and an acid, the chemical reaction being an acid-base titration, and the second disk further including a pH-indicating dye.

7. The use indicator of claim 6, wherein the base comprises sodium bicarbonate, the acid comprises acetic acid, and the pH-indicating dye comprises phenol red.

8. The use indicator of claim 5, wherein the chemical reaction is selected from a group consisting of a chemical oxidation-reduction reaction, an addition reaction, a subtraction reaction, and an initiation of an enzymatic reaction.

9. The use indicator of claim 5, wherein the first chemical is a liquid, the second chemical is a liquid, and the chemical reaction forms a gas from the liquids to create pressure to produce a detectable indication.

10. The use indicator of claim 1, wherein the intermediate layer comprises an annular spacer defining a gap between the first and second disks, across which the first chemical released from the first disk migrates to the second disk.

11. The use indicator of claim 10, wherein the gap is filled with a barrier material.

12. The use indicator of claim 1, wherein the first and second disks comprise porous hydrophilic material selected from a group consisting of sintered glass, foamed glass, sintered metal, ceramic, polyethylene, polypropylene, and nylon.

13. The use indicator of claim 1, wherein the intermediate layer comprises material selected from a group consisting of nylon, polyester, and fluoroethylenes.

14. A method of notifying a user of a predetermined amount of use of a device as measured by vibration of the device, the method comprising the steps of:
   (a) coupling a use indicator to the device, the use indicator comprising:
      (i) a first disk retaining a first chemical therein,
      (ii) a second disk, and
      (iii) an intermediate layer separating the first disk and the second disk;
   (b) using the device and the use indicator;
   (c) transferring the first chemical in response to vibration of the device from the first disk across the intermediate layer to the second disk; and
   (d) producing a detectable indication of use of the device when the first chemical is received by the second disk in excess of a predetermined amount the predetermined amount being above zero.

15. The method of claim 14, wherein the device to which the use indicator is coupled is a power toothbrush including a toothbrush body and a brush head that is removably coupled to the toothbrush body, and the use indicator is a brushwear indicator attached to the brush head.

16. The method of claim 14, wherein the detectable indication is a visible change.

17. The method of claim 16, wherein the visible change is a color or shade change.

18. The method of claim 14, wherein the second disk retains a second chemical therein, and the production of a detectable indication comprises producing a chemical reaction between the first chemical and the second chemical within the second disk.

19. The method of claim 18, wherein the first chemical and the second chemical comprise an acid and a base, or a base and an acid, the second disk further including a pH-indicating dye, and the production of a chemical reaction comprising an acid-base titration that visibly changes the color or shade of the pH-indicating dye in the second disk.

20. The method of claim 19, wherein the base comprises sodium bicarbonate, the acid comprises acetic acid, and the pH-indicating dye comprises phenol red.

21. The method of claim 18, wherein the chemical reaction is selected from a group consisting of a chemical oxidation-reduction reaction, an addition reaction, a subtraction reaction, and an initiation of an enzymatic reaction.

22. The method of claim 18, wherein the first chemical is a liquid, the second chemical is a liquid, and the chemical reaction forms a gas from the liquids to create pressure to produce a detectable indication.

23. The method of claim 14, wherein the intermediate layer comprises an annular spacer defining a gap between the first and second disks, across which the first chemical released from the first disk migrates to the second disk.

24. The method of claim 23, wherein the gap is filled with a barrier material.

25. The method of claim 14, wherein the first and second disks comprise porous hydrophilic material selected from a group consisting of sintered glass, foamed glass, sintered metal, ceramic, polyethylene, polypropylene, and nylon.

26. The method of claim 14, wherein the intermediate layer comprises material selected from a group consisting of nylon, polyester, and fluoroethylenes.

* * * * *